United States Patent
Yamawaki et al.

(10) Patent No.: US 7,076,231 B2
(45) Date of Patent: Jul. 11, 2006

(54) RECEIVER APPARATUS CONTROLLING THE POWER CONSUMPTION ACCORDING TO THE RECEPTION SIGNAL LEVEL

(75) Inventors: Taizo Yamawaki, Tokyo (JP); Satoshi Tanaka, Kokubunji (JP); Yasuyuki Okuma, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 10/374,106

(22) Filed: Feb. 27, 2003

(65) Prior Publication Data
US 2003/0186669 A1 Oct. 2, 2003

(30) Foreign Application Priority Data
Apr. 1, 2002 (JP) .............................. 2002-098486

(51) Int. Cl.
*H04B 1/26* (2006.01)
(52) U.S. Cl. .................. 455/323; 455/343.2; 455/314; 327/116; 327/355
(58) Field of Classification Search ............ 455/343.2, 455/343.4, 343.1, 226.2, 311, 310, 234.2, 455/255, 253.2, 226.3, 258, 250.1, 273, 276.1, 455/278.1, 296, 295, 304, 241.1, 254, 251, 455/550.1, 575.1, 424, 425, 456.5, 456.6, 455/63.1, 67.11, 561, 504, 501, 101, 114.2, 455/313–326, 22, 190.1; 330/124 D, 51, 330/298; 375/341, 98, 347, 261, 148, 150, 375/203, 202, 206, 340, 324, 100, 285, 346; 331/105, 107 R; 370/342, 320, 335, 310, 370/319; 327/355, 116
See application file for complete search history.

(56) References Cited

U.S. PATENT DOCUMENTS
5,402,451 A * 3/1995 Kaewell et al. ............. 375/347

(Continued)

FOREIGN PATENT DOCUMENTS
JP 10-256930 3/1997

OTHER PUBLICATIONS
Behazad Razavi, "RF MICROELECTRONICS", Prentice Hall PTR, pp. 122-129, 138-144, 146-147 and 209-231.

*Primary Examiner*—Edward F. Urban
*Assistant Examiner*—Charles Chow
(74) *Attorney, Agent, or Firm*—Reed Smith LLP; Stanley P. Fisher, Esq.; Juan Carlos A. Marquez, Esq.

(57) ABSTRACT

A receiver apparatus is provided with a receiver section including an amplifying stage for amplifying a high frequency signal received by an antenna, a frequency converting stage for converting a frequency of the output signal of the amplifying stage, a local oscillator for supplying a local oscillating signal to the frequency converting stage, and a signal processing section for supplying a control signal to the receiver section depending on signal intensity inputted to the receiver section, or to the signal processing section from the receiver section. The frequency converting section includes a plurality of parallel frequency converters, and an adder for adding output signals of the frequency converters. The signal processing section controls the number of the frequency converters to be operated.

20 Claims, 13 Drawing Sheets

U.S. PATENT DOCUMENTS

| | | | |
|---|---|---|---|
| 5,513,386 A * | 4/1996 | Ogino et al. | 455/234.1 |
| 5,896,562 A * | 4/1999 | Heinonen | 455/76 |
| 5,986,500 A * | 11/1999 | Park et al. | 330/124 D |
| 6,026,288 A * | 2/2000 | Bronner | 455/343.2 |
| 6,075,980 A * | 6/2000 | Scheck | 455/324 |
| 6,091,308 A * | 7/2000 | Salle | 331/111 |
| 6,339,711 B1 | 1/2002 | Otaka et al. | |
| 6,731,917 B1 * | 5/2004 | Krishna | 455/205 |
| 2002/0032009 A1 | 3/2002 | Otaka et al. | |
| 2002/0119763 A1 * | 8/2002 | Ramachandran et al. | 455/296 |

* cited by examiner

RECEIVER APPARATUS CONTROLLING THE POWER CONSUMPTION ACCORDING TO THE RECEPTION SIGNAL LEVEL

BACKGROUND OF THE INVENTION

The present invention relates to a receiver apparatus used in a mobile communication system such as a portable telephone, and in particular, to a receiver apparatus with reduced power consumption.

The services originally provided to users by a mobile communication system have been primarily an audio communication, however, recently the function has been progressed to a higher degree in which a data communication is capable. Corresponding to this, large parts consuming much power such as an FM sound source and a large type display device have been mounted on a terminal. Because of this, it has been requested to further reduce the power consumption of the parts constituting the terminal. The receiver section of the direct conversion system is described, for example, in Behazad Razavi "RF MICROELECTRONICS", PRENTICE HALL PTR, pp. 122–129, 138–144, 146–147 and 209–231, or JP-A-10-256930 corresponding to U.S. Pat. No. 6,339,711 and U.S. patent application publication No. 20,020,032,009.

SUMMARY OF THE INVENTION

FIG. 11 is a block diagram showing a constitution of an example of a receiver section of the direct conversion system.

In a receiver section of the direct conversion system shown in FIG. 11, a high frequency signal received by an antenna is supplied to a low noise pre-amplifier (LNA) 100 in order to improve the noise figure (NF) of the overall receiver section, and a predetermined gain is provided to become a signal S100. The signal S100 is supplied to mixers 101 and 103. On the other hand, a signal supplied from a local oscillator 108 is converted to signals S101 and S102 by a phase shifter (PS) 107, having phases 90 degrees shifted from each other. In this respect, a frequency divider may be used as the phase shifter 107. The signals S101 and S102 are given predetermined gains respectively at amplifiers 105 and 106, and become signals S103 and S104. The signals S103 and S104 are respectively supplied to mixers 101 and 103. The center frequency of the signal S100 is the same as the frequencies of the signals S103 and S104. In the mixer 101, the signal S100 is multiplied by the signal S103, and becomes a base band signal S105, and in the mixer 103, the signal S100 is multiplied by the signal S104, and becomes a base band signal S106. The base band signals S105 and S106 respectively pass through base band filters (BB FILS) 102 and 104 and supplied to a signal processing section 109. Each of the base band filters 102 and 104 is constituted with a variable gain amplifier and a lowpass filter, and for the purpose of the analog-to-digital conversion performed in the signal processing section 109, an anti-aliasing processing is carried out. The gain of the variable gain amplifiers in the base band filters 102 and 104 are respectively controlled by control signals from the signal processing section 109 so that the output levels of the base band filters 102 and 104 become constant. Further, it is possible to constitute to perform the channel selection by the base band filters 102 and 104. The signal processing section 109, after converting the supplied signals to digital signals, performs a predetermined signal processing, and performs demodulation to a desired audio, or data signal.

The problem in the receiver section of the direct conversion system shown in FIG. 11 is that the power consumption becomes large. Because the receiver section provided in a receiver apparatus must always satisfy the performance specified in its system, it is designed based on the worst receiving condition in which the receiver section is placed. Here, the worst receiving condition is that, for example, a desired receiving signal is at the lowest level (receiving sensitivity level), or an interference wave level is at the maximum.

Equation 1 shows a noise figure (NF) of the overall receiver section of the direct conversion system shown in FIG. 11.

$$NF_t = NF_1 + (NF_2-1)/G_1 + (NF_3-1)/G_1G_2 + (NF_4-1)/G_1G_2G_3 \quad (1)$$

Here, $NF_1$ is NF of the low-noise amplifier (LNA), $NF_2$ is NF of the mixer, $NF_3$ is NF of the variable gain amplifier, $NF_4$ is NF of the lowpass filter, and $NF_t$ is NF of the overall receiver section. Also, $G_1$ is gain of the low-noise amplifier, $G_2$ is gain of the mixer, $G_3$ is gain of the variable gain amplifier. Also, it is assumed that impedances between respective circuits are matched, and that each of the base band filters (BB FILS) 102 and 104 is constituted by a variable gain amplifier and a lowpass filter connected to its output.

Each NF and gain are designed based on the above-mentioned worst receiving condition. When the receiving signal level is large, in order to make constant the output levels of the base band filters, $G_3$ is designed to be small corresponding to this receiving condition, and $NF_3$ is also deteriorated correspondingly. However, as will be seen from the equation 1, the influence of the deterioration of $NF_3$ to $NF_t$ is small, and $NF_t$ is maintained at substantially constant irrespective of that receiving signal level. Accordingly, when that receiving signal level is larger than the receiving sensitivity level, the signal-to-noise ratio (SNR) of the output of the receiver section becomes excessively large as compared with the carrier-to-noise ratio (CN) to satisfy the bit error rate required in the system.

FIG. 12 illustrates NF of the overall receiver section of the direct conversion system shown in FIG. 11.

FIG. 12 shows a condition in which a desired wave and an interference wave are simultaneously received at the receiver section of the direct conversion system shown in FIG. 11. A bandpass filter (BPF) 1004 is connected to the input of the low noise amplifier (LNA) 100 to suppress the interference wave contained in the received signal. In FIG. 12, fw shows a desired wave frequency, and fb shows an interference wave frequency. Also, CNin represents the carrier-to-noise ratio CN [dB] of the received signal at an antenna, $ATT_{BPF}$ represents the degree of suppression [dB] of the bandpass filter (BPF) at the interference wave frequency with respect to the desired wave frequency, and PN represents a phase noise [dBc/Hz] of a local oscillating signal (local signal) S103 at the interference wave frequency with respect to the desired wave frequency.

CNout [dB] at the output of the mixer 101 is represented by equation 2.

$$CNout = CNin - ATT_{BPF} + PN \quad (2)$$

In equation 2, $ATT_{BPF}$ and PN are predetermined fixed values, and designed based on the worst receiving condition specified by the system. Accordingly, it will be seen that when the desired wave signal level is increased and CNin becomes large, CNout becomes also large, and it becomes excessively large with respect to a large desired wave level.

Next, when considering as to a dynamic range (linear input range) of the receiver section, when the interference wave level is small, the dynamic range is set excessively large with respect to this small interference wave level, and this becomes a cause of consuming excessively large power.

Next, another receiver section of the direct conversion system different from the one shown in FIG. 11 will be explained. FIG. 13 is a block diagram showing another constitution of the receiver section of the direct conversion system.

In the receiver section of the direct conversion system shown in FIG. 13, a high frequency signal received by an antenna is divided into two parts after passing through a low noise amplifier (LNA) 200 and a mixer 201, and the two parts are respectively supplied to amplifiers 202 and 203. A filter 204 is a filter which allows to pass only a signal band, and a power detector (RSSI) 206 detects power of the signal band. On the other hand, a filter 205 is a filter which allows to pass the whole frequency band used in the radio communication system, and a power detector (RSSI) 207 detects power within the band of the radio communication system.

And the power detected by the power detectors (RSSIs) 206 and 207 are compared in a comparator 108, and a difference or a ratio of both power is calculated, and in a decision device (DECISION) 209, an interference wave level inputted to the receiver section is estimated in accordance with a predetermined algorithm. A control signal output from the decision device 209 is delayed by one frame or one slot in a delay element 210, and by supplying the delayed control signal to the low noise amplifier 200 and the mixer 201, a bias current of the circuit of the low noise amplifier 200 and the mixer 201 is changed over. By controlling this bias current, the dynamic range of the low noise amplifier 200 and the mixer 201 are controlled. For example, when the interference wave level is large, the bias current of the low noise amplifier 200 and the mixer 201 is increased, to thereby enlarge the dynamic range. Generally, in the low noise amplifier 200 and the mixer 201, by increasing their bias current, the dynamic range can be made wide. Also, when the interference wave level is small, since it is allowed to make the dynamic range narrow, the bias current of the low noise amplifier 200 and the mixer 201 is decreased. As mentioned above, by changing the dynamic range according to the estimated interference wave level, it is possible to reduce the mean power consumption of the receiver section.

The problem in the receiver section of the direct conversion system show in FIG. 13 is that it is difficult to estimate the time at which the interference wave is received in the receiver section. For example, in the case where after reducing the dynamic range of the receiver section based on the interference wave level at certain time, when an interference wave having a level above that level is received, the dynamic range of the receiver section is insufficient, and a desired wave would be suppressed, and the demodulation quality would be deteriorated.

In this manner, in the above-mentioned receiver section (FIG. 11), there is a problem in which the power based on the worst receiving condition is always consumed irrespective of the received signal level. Also, although the receiver section (FIG. 13) is constituted to reduce the mean power consumption according to the estimated interference wave level, there is a problem in which the estimation of the input time of the interference wave is difficult, and the demodulation quality would be deteriorated when the interference wave becomes large from a small level.

It is an object of the present invention to reduce the mean power consumption of the receiver section by decreasing the power consumed by the receiver section depending on the received signal level, without causing deterioration of the demodulation quality due to the interference wave.

A receiver apparatus according to the present invention comprises: a receiver section including an amplifying stage for amplifying a high frequency signal received by an antenna, a frequency converting stage for converting a frequency of an output signal of the amplifying stage, and a local oscillator for supplying a local oscillation signal to the frequency converting stage; and a signal processing section for supplying a control signal to the receiver section according to signal intensity inputted to the signal processing section from the receiver section, wherein the frequency converting stage includes a plurality of frequency converters provided in parallel, and an adder for adding output signals from the frequency converters, and wherein the signal processing section controls, by the control signal, the number of frequency converters to be operated.

Also, the frequency converter includes a mixer for converting a frequency by combining the signals, a phase shifter for converting a phase of the local oscillating signal, and a buffer amplifier for amplifying an output signal of the phase shifter and for supplying to the mixer; and the buffer amplifier is arranged to form a pair with the mixer, and an output of the buffer amplifier is inputted to one of the mixers.

Also, the signal processing section supplies a control signal to the local oscillator depending on signal intensity which is inputted to the signal processing section, and the local oscillator controls a phase noise level of the local oscillating signal by the control signal.

Also, the amplifying stage includes a plurality of pre-amplifiers provided in parallel, and an adder for adding outputs of the pre-amplifiers, and the signal processing section controls the number of the plurality of pre-amplifiers which are to be operated.

According to the present invention, a receiver apparatus comprises:

a receiver section including an amplifying stage for amplifying a high frequency signal received by an antenna, a frequency converting stage for converting a frequency of an output signal of the amplifying stage, and a local oscillator for supplying a local oscillating signal to the frequency converting stage;

and a signal processing section for supplying a control signal to the receiver section depending on signal intensity inputted to the receiver section, or signal intensity inputted to signal processing section from the receiver section, wherein the frequency converting stage includes a plurality of frequency converters provided in parallel, and an adder for adding output signals from the frequency converters, and wherein the signal processing section controls the number of frequency converters to be operated, by the control signal. As a result, in the case where the received signal level is large, and a carrier-to-noise ratio (CN) value at the receiver section output is excessively good as compared with a desired level, it is possible to control the number of frequency converters operated in the frequency converting stage while maintaining a dynamic rage of the frequency converting stage, thereby to reduce the power consumption of the receiver section. Therefore, it is possible to reduce the power consumption of the receiver section without causing the deterioration of the demodulation quality due to the interference wave.

Also, the frequency converter includes a mixer for converting a frequency by combining the signals, a phase shifter for converting a phase of the local oscillating signal, and a buffer amplifier for amplifying the output signal of the phase shifter and supplying to the mixer; and the buffer amplifier is arranged forming a pair with the mixer, and the output of the buffer amplifier is inputted to one of the mixers. As a result, it is possible to further reduce the power consumption by controlling the operation of the buffer amplifier depending on an operating condition of the mixer. Furthermore, since the load of the buffer amplifier is not changed depending on the operating condition of the mixer, a change in the local oscillating signal level which is inputted to the mixer is suppressed, and stabled receiver section can be provided.

Also, the signal processing section supplies a control signal to the local oscillator depending on signal intensity which is inputted to the signal processing section from the receiver section, and the local oscillator controls a phase noise level of the local oscillating signal. As a result, in the case where the received signal level is large, and the carrier-to-noise ratio value at the receiver section output is excessively good as compared with a desired level, since it is possible to reduce the power consumption of the receiver section by controlling a phase noise level of the local oscillator while maintaining the dynamic range of the frequency converting stage, it is possible to reduce the power consumption without causing deterioration of the demodulation quality due to the interference wave.

Also, the amplifying stage includes a plurality of pre-amplifiers provided in parallel, and an adder for adding outputs of the pre-amplifiers, and the signal processing section controls the number of the plurality of pre-amplifiers which are to be operated. As a result, in the case where the received signal level is large, and the carrier-to-noise ratio (CN) value at the receiver section output is excessively good as compared with a desired level, since it is possible to reduce the power consumption of the receiver section by controlling a phase noise level of the local oscillator while maintaining the dynamic range of the frequency converting stage, it is possible to reduce the power consumption without causing deterioration of the demodulation quality due to the interference wave.

Other objects, features and advantages of the invention will become apparent from the following description of the embodiments of the invention taken in conjunction with the accompanying drawings.

DESCRIPTION OF THE EMBODIMENTS

Embodiments of the present invention will be explained with reference to the drawings.

Figure 1:
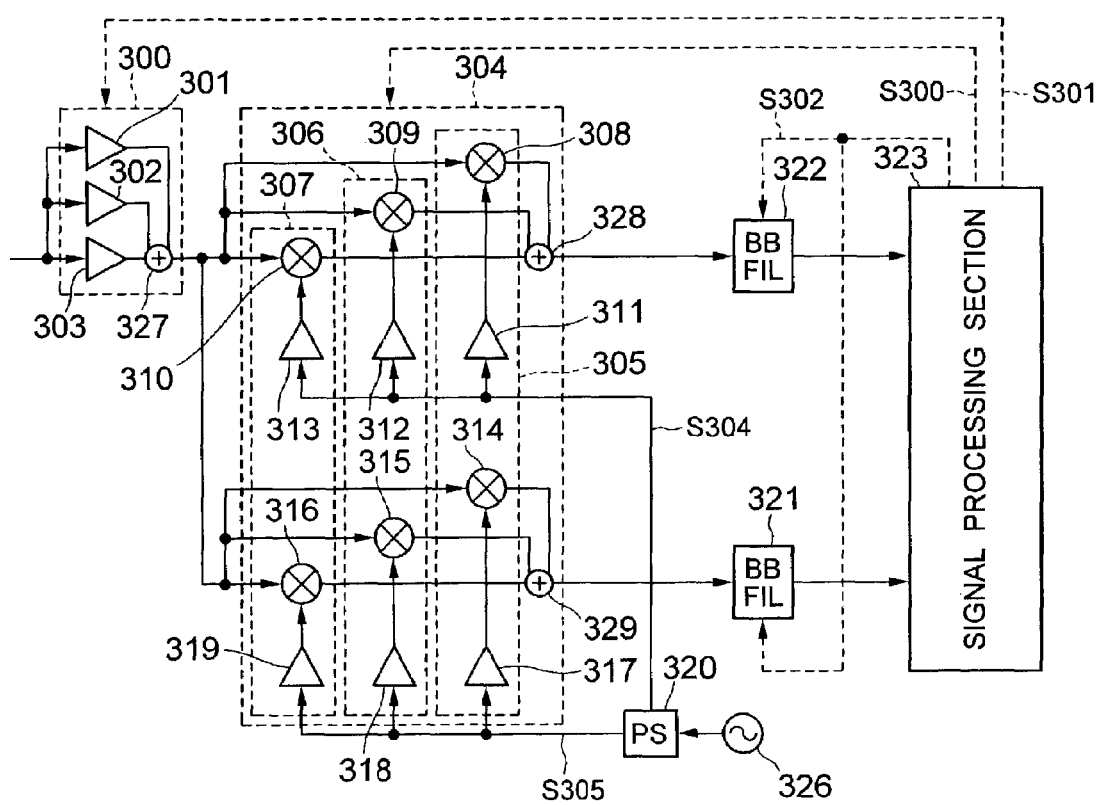
FIG. 1 is a block diagram of a receiver section of the direct conversion system in a first embodiment of the present invention.

FIG. 1 is a block diagram showing a constitution of a low power consumption receiver section in a first embodiment of the present invention.

The receiver section shown in FIG. 1 is a receiver section of the direct conversion system, and includes a low noise amplifying stage 300 for giving a desired gain to a high frequency signal which is received, a frequency converting stage 304 for frequency converting an output signal of the low noise amplifying stage 300 to a base band signal, base band filters (BB FIL) 321 and 322 for selecting a signal of a desired frequency and giving a gain, a local oscillator 326, a phase shifter (PS) 320 for converting an output signal of the local oscillator 326 to signals having phases shifted by 90 degrees from each other, and supplying to the frequency converting stage 304, and a signal processing section 323. The gain of a variable gain amplifier included in each of the base band filters (BB FILs) 321 and 322 is controlled by a control signal S302 from the signal processing section 323 so that the output signals from the base band filters 321 and 322 become constant.

The low noise amplifying stage 300 includes low noise pre-amplifiers (LNA) 301, 302, 303, formed by identical circuit structures and connected in parallel, and an adder 327 for adding output signals of the LNAs 301, 302, 303. The operation of the low noise amplifying stage 300 is controlled by a control signal S301 from the signal processing section 323, and at least one of the LNAs 301, 302, 303 is operated during the time when the receiver section is operating. Because LNAs 301, 302, 303 are connected in parallel, it is possible to maintain the input dynamic range at constant irrespective of the number of operating LNAs. The output signal of each LNA is added by the adder 327, and since the added signal becomes the output signal of the low noise amplifying stage 300, it is possible to change over the gain of the low noise amplifying stage 300 depending on the number of operating LNAs. Also, it is possible to change the power consumption of the low noise amplifying stage 300 by the number of the operating LNAs. For example, as compared with the case where all (three) the LNAs in the low noise amplifying stage 300 are operated, when only one LNA is operated, the gain and the power consumption become respectively ⅓. The output of this low noise amplifying stage 300 branches into two parts, and supplied to a two-system mixer group (first mixer group includes mixers 308, 309, 310 and second mixer group includes mixers 314, 315, 316). In the present embodiment, although LNAs 301, 302, 303 have identical circuit structures, the circuit structure may be different for each LNA, so that their gains and current consumption are respectively different.

The frequency converting stage 304 is constituted by mixers 308, 309, 310, 314, 315, 316 having identical circuit structures, by amplifiers 311, 312, 313, 317, 318, 319 having identical circuit structures, and by adders 328, 329. The mixers 308, 309, 310 are connected in parallel with others to form the first mixer group, and mixers 314, 315, 316 are also connected in parallel with others to form the second mixer group. In the amplifiers 311, 312, 313, although their input portions are connected in parallel with others, their output portions are not connected in parallel, and respectively connected to mixers 308, 309, 310. That is, the output of the amplifier 311 is connected to mixer 308, the output of the amplifier 312 is connected to mixer 309, and the output of the amplifier 313 is connected to mixer 310. The outputs of the mixers 308, 309, 310 are added by the adder 328 and supplied to the BB FIL 322.

Similarly, in amplifiers 317, 318, 319, although their input portions are connected in parallel with others, their output portions are not connected in parallel, and respectively connected to mixers 314, 315, 319. That is, the output of the amplifier 317 is connected to mixer 314, the output of the amplifier 318 is connected to mixer 315, and the output of the amplifier 319 is connected to mixer 316. The outputs of the mixers 314, 315, 316 are added by the adder 329 and supplied to the BB FIL 321.

On the other hand, the local oscillator 326 produces a local oscillating signal (local signal) having a frequency the same as the output center frequency of the low noise amplifying stage 300, and supplies to the frequency converting stage 304. This local signal is converted by the phase shifter 320 to two signals S304 and S305 having phases shifted by 90 degrees from each other. Also, as the phase shifter 320, a frequency divider may be used. The signal 304 is given a predetermined gain by the amplifiers 311, 312, 313 and respectively supplied to the mixers 308, 309, 310. Also, the signal S305 having the phase shifted by 90 degrees from that of the signal S304 is given a predetermined gain by the amplifiers 317, 318, 319 and respectively supplied to the mixers 314, 315, 319.

The frequency converting stage 304 is controlled as to its operation/non-operation by the control signal S300 from the signal processing section 323. The operation of the frequency converting stage 304 is controlled for each of control units 305, 306, 307. For example, when the control is performed to make the control unit 305 non-operation, the operation of the mixers 308, 314 and amplifiers 311, 317 is stopped. Also, when the receiver section is operating, it is controlled so that at least one of the control units 305, 306, 307 operates.

As mentioned above, since the mixer and the amplifier for amplifying the local signal supplied to the mixer are provided in one-to-one relationship, even when the operation/non-operation of the mixer is changed over, the load of the amplifier is not changed. As a result, the local signal level which is inputted to each mixer 308–310, 314–316 is constant irrespective of the control of operation/non-operation of the other mixers. Accordingly, even when the operation/non-operation of the frequency converting stage 304 is performed, it becomes possible to change the gain of the frequency converting stage 304 while maintaining the input dynamic range of the frequency converting stage 304 at constant. In this respect, supposing that the output portions of the amplifiers 311, 312, 313 are connected in parallel, and their outputs are inputted to the mixers 308, 309, 310, since the load of the amplifiers 311, 312, 313 is changed due to the control of the operation/non-operation of the mixers, the local signal level which is inputted to the mixers 308, 309, 310 would be changed. Therefore, it becomes impossible not to degrade the input dynamic range irrespective of the operation/non-operation of the mixers.

Also, by the control of the operation/non-operation, the power consumption of the frequency converting stage 304 can be changed. For example, as compared with the case where all the control units of the frequency converting stage 304 are turned on, when only one control unit is turned on, the gain of the frequency converting stage 304 is reduced to ⅓, and the current consumption is reduced to ⅓. Generally, the characteristic of the mixer such as gain and linearity of the mixer depends on its local signal level.

In a mixer which is in an operating state among the mixers 308, 309, 310, the output signal of the low noise amplifying stage 300 is multiplied by the local signal S304 to become a base band signal, and is supplied to the signal processing section 323 passing through the base band filter (BB FIL) 322. Similarly, in a mixer which is in an on state among the mixers 314, 315, 316, the output signal of the low noise amplifying stage 300 is multiplied by the local signal S305 to become a base band signal and is supplied to the signal processing section 323 passing through the base band filter (BB FIL) 321. Each of the BB FILs 321, 322 is constituted by a lowpass filter and a variable gain amplifier, and for the purpose of analog to digital conversion which is performed in the signal processing section 323, the anti-aliasing processing is performed. The gain of the variable gain amplifier is controlled by the control signal S302 from the signal processing section 323 so that the output level of the BB FILs 321, 322 becomes constant. Also, there is a case in which the channel selection is carried out in the BB FILs 321, 322. The signal processing section 323, after converting the input signal to a digital signal, performs a predetermined signal processing, and demodulates to a desired audio or data signal.

When the received signal level is small to the extent of a receiving sensitivity level specified by the system, it is controlled so that all the low noise amplifiers (LNAs) within the low noise amplifying stage 300 and all the control units of the frequency converting stage 304 are operated. This corresponds in equation 1 to that G1 and G2 become maximum. Therefore, the noise figure (NF) of the overall receiver section becomes minimum, and the carrier-to-noise ratio (CN) of sufficient receiver section output can be ensured. Also, since all the LNAs and all the control units are operated, the current consumption of the receiver section becomes maximum.

On the other hand, when the received signal level is increased and CN becomes excessively large, a desired number of LNAs and a desired number of control units are controlled to be in the non-operating state among the LNAs of low noise amplifying stage 300 and the control units of frequency converting stage 304. This corresponds to the case where in equation 1, G1 and G2 assume smaller values than the maximum values. Accordingly, the overall NF of the receiver section is deteriorated. But, the amount of this deterioration is controlled to become smaller than the amount of CN which became excessively large due to the increase of the received signal level. Therefore, sufficient CN can be ensured in the receiver section output. Also, since only the desired number is controlled to be placed in the non-operating state among the LNAs of low noise amplifying stage 300 and the control units of frequency converting stage 304, the current consumption of the receiver section is reduced to smaller value than the maximum value.

By virtue of the control of operation/non-operation of the LNAs of low noise amplifying stage 300 and the control units of frequency converting stage 304, corresponding to the received signal level mentioned above, the mean current consumption of the receiver section can be reduced. Furthermore, as mentioned above, since the dynamic rage of the low noise amplifying stage 300 and the frequency converting stage 304 is maintained at constant independent of the operation/non-operation control, the demodulation quality is never deteriorated due to the interference wave.

In other words, in the receiver section in the embodiment shown in FIG. 1, it is selectively controlled so that one or more circuits in the LNAs of low noise amplifying stage 300 and the control units of frequency converting stage 304 are operated depending on the received signal level. And the number of circuits controlled to be non-operation is determined by a desired CN in the receiver output determined by the radio communication system and the signal processing section 323, and determined by the current consumption of the LNAs of low noise amplifying stage 300 and the control units of frequency converting stage 304.

In the foregoing, it is explained as to the case where the parallel number of the LNAs and the mixers is three (3), however, these parallel number will be allowed when they are two or more.

Figure 2:
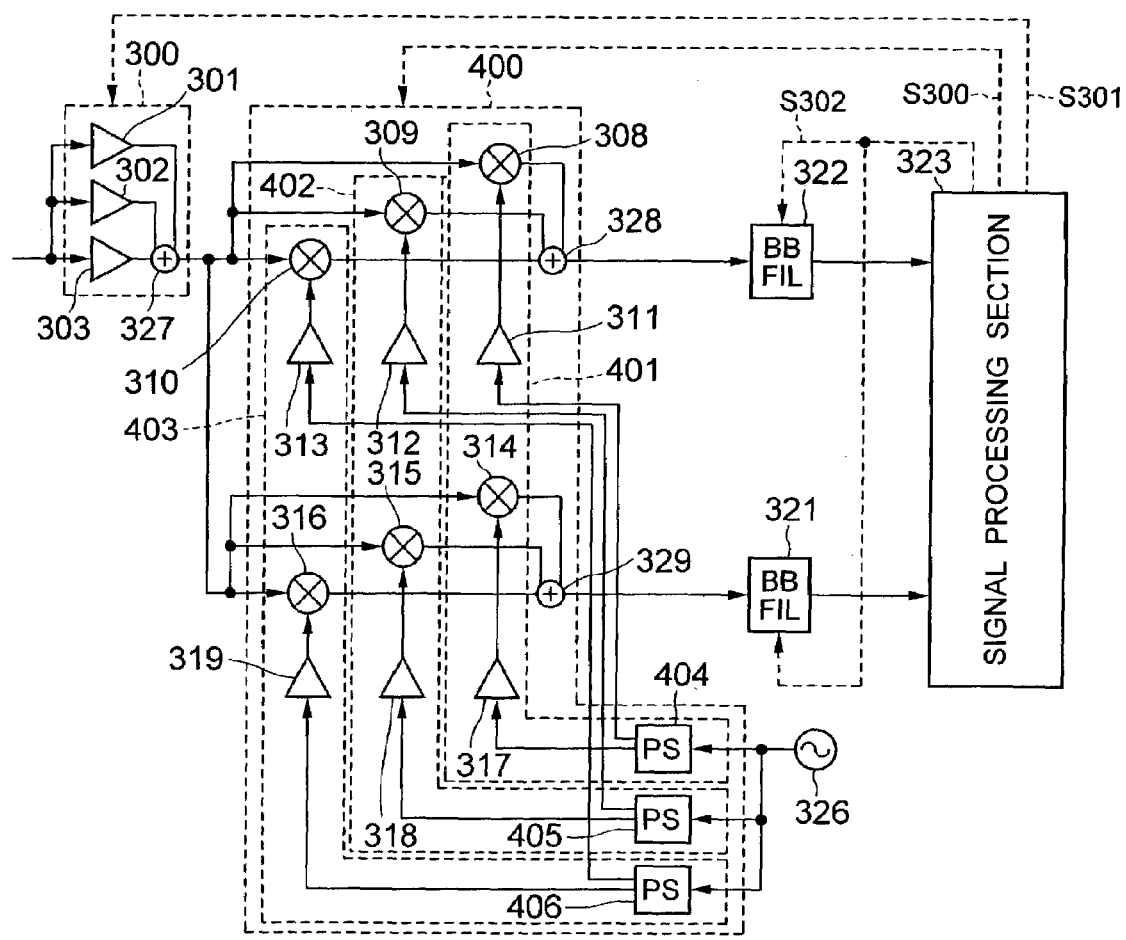
FIG. 2 is a block diagram of a receiver section of the direct conversion system in a second embodiment of the present invention.

FIG. 2 is a block diagram showing the constitution of a low power consumption receiver section in a second embodiment of the present invention. The receiver section shown in FIG. 2 is different from the receiver section (refer to FIG. 1) in the first embodiment, and the phase shifter 320 is divided into three phase shifters 404, 405, 406, and each phase shifter is included in each control unit so that the phase shifter is also controlled as to the operation/non-operation. Constituent elements similar to the receiver section in the first embodiment (refer to FIG. 1) are given with similar reference numerals and their detailed explanations are omitted.

A local oscillating signal (local signal) produced by a local oscillator 326 is supplied to the phase shifters 404, 405, 406. And outputs of the phase shifters 404, 405, 406 are respectively connected to amplifiers 311, 312, 313, and also respectively connected to amplifiers 317, 318, 319.

The frequency converting stage 400 includes mixers 308, 309, 310, 314, 315, 316, and amplifiers 311, 312, 313, 317, 318, 319, and adders 328, 329, and the operation/non-operation is controlled by the control signal S300 from the signal processing section 323. The operation of a frequency converting stage 400 is controlled for each control unit 401, 402, 403. The control unit 401 includes mixers 308, 314, and amplifiers 311, 317, and the phase shifter 404. Also, the control unit 402 includes mixers 309, 315, and amplifiers 312, 318, and the phase shifter 405. Also, a control unit 403 includes mixers 310, 316, and amplifiers 313, 319, and the phase shifter 406. And, each control unit is controlled as to its operation/non-operation by a control signal S300 from a signal processing section 323, and all the circuits included in the control unit are controlled to enter an operating state or a non-operating state.

In other words, in the second embodiment shown in FIG. 2, different from the first embodiment (refer to FIG. 1), a plurality of phase shifters are provided in the receiver section, and these phase shifters are respectively included in the control units, and since the operation/non-operation is controlled for each control unit, the power consumption can be further reduced as compared with the receiver section in the first embodiment.

Figure 3:
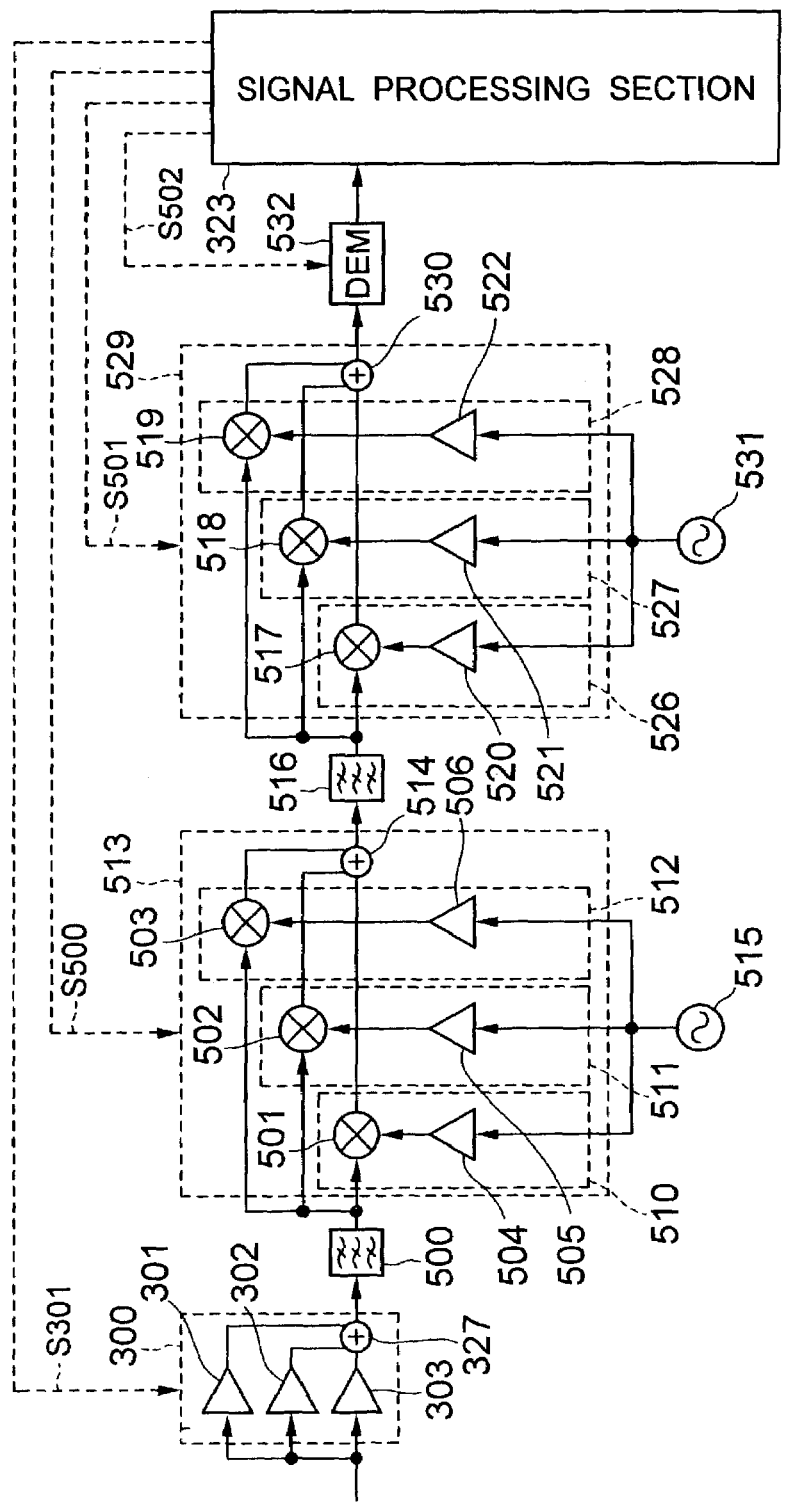
FIG. 3 is a block diagram of a receiver section of the double superheterodyne system in a third embodiment of the present invention.

FIG. 3 is a block diagram showing the constitution of a low power consumption receiver section in a third embodiment of the present invention.

The receiver section shown in FIG. 3 is a receiver section of the double super heterodyne system (dual-IF system), and includes a low noise amplifying stage 300 for giving a desired gain to a received high frequency signal, a bandpass filter (BPF) 500 for suppressing an undesired signal from the output signal of the low noise amplifying stage 300, a frequency converting stage 513 for converting a frequency of the output signal of the BPF 500 to a first intermediate frequency, a bandpass filter (BBF) 516 for suppressing an undesired signal from the output signal of the frequency converting stage 513, a frequency converting stage 529 for converting a frequency of the output signal of the BPF 516 to a second intermediate frequency, a demodulator (DEM) 532 for converting the output signal of the frequency converting stage 529 to a base band signal, a local oscillator 515 for supplying a first local oscillating signal (first local signal) to the frequency converting stage 513, a local oscillator 531 for supplying a second local oscillating signal (second local signal) to the frequency converting stage 529, and a signal processing section 323. Also, constituent elements similar to those in the receiver section (refer to FIG. 1) in the first embodiment are attached with similar reference numerals, and detailed explanations are omitted.

In the demodulator (DEM) 532, a variable gain amplifier is included, and its gain is controlled by a control signal S502 from the signal processing section 323 so that the output signal level of the demodulator 532 becomes constant.

The reduction of the power consumption explained in the first embodiment is, in the third embodiment, realized by the operation/non-operation control with respect to the frequency converting stages 513, 529. The frequency converting stages 513, 529 are similar to the constitution in the frequency converting stage 400 in the above-mentioned second embodiment (FIG. 2) which includes mixers 308, 309, 310, and amplifiers 311, 312, 313. In other words, the mixers in the third embodiment 501, 502, 503, 517, 518, 519 operate similar to the mixer 308, and amplifiers 504, 505, 506, 520, 521, 522 operate similar to the amplifier 311.

The frequency converting stages 513 is divided into control units 510, 511, 512. The control unit 510 includes the mixer 501, and the amplifier 504. The control unit 511 includes the mixer 502, and the amplifier 505. Also the control unit 512 includes the mixer 503, and the amplifier 506. And each of the control units is controlled as to the operation/non-operation by a control signal S500 from the signal processing section 323, and all the circuits included in the control unit are controlled to respective operation/non-operation states.

Also, the frequency converting stages 529 is divided into control units 526, 527, 529. The control unit 526 includes the mixer 517, and the amplifier 520. Also the control unit 527 includes the mixer 519, and the amplifier 522. And each of the control units is controlled as to the operation/non-operation by a control signal S501 from the signal processing section 323, and all the circuits included in the control unit are controlled to respective operation/non-operation states.

In other words, in the receiver section in the third embodiment, with respect to the low noise amplifying stage 300, frequency converting stages 513, 529, the operation/non-operation is controlled by respective control signals S301, S500, S501 from the signal processing section 323.

Figure 4:
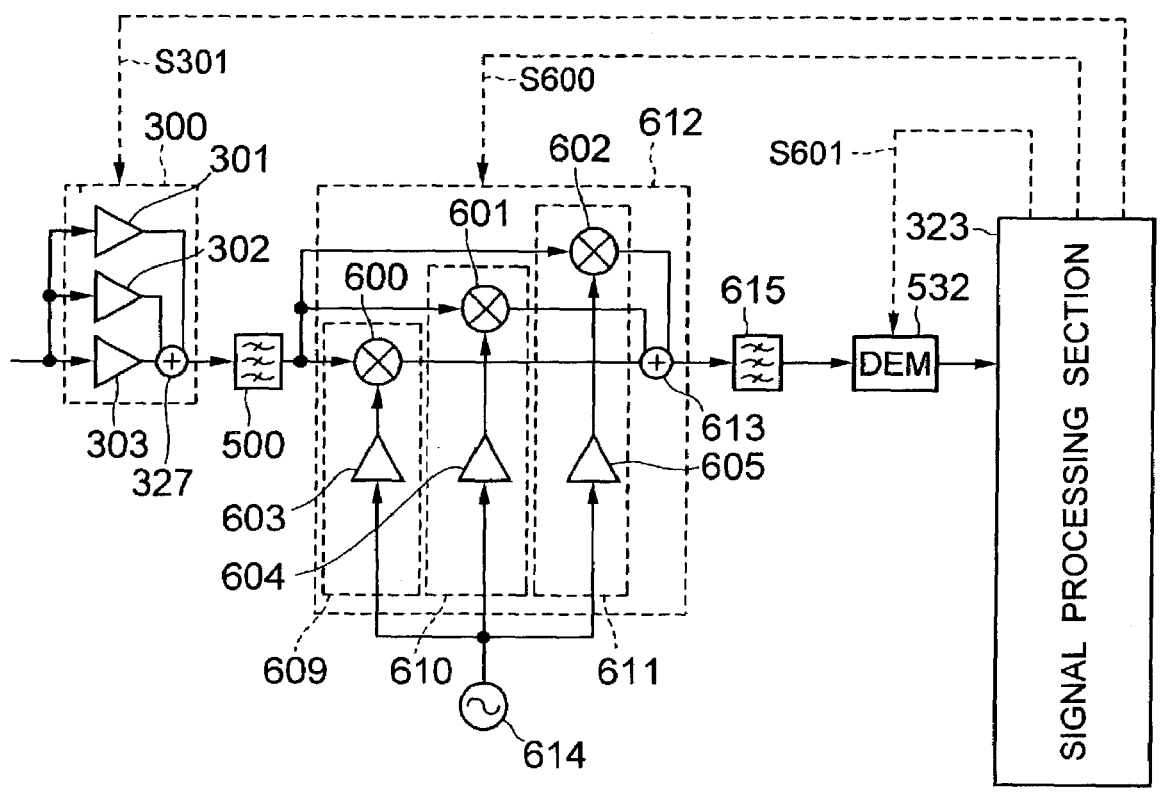
FIG. 4 is a block diagram of a receiver section of the single superheterodyne system in a fourth embodiment of the present invention.

FIG. 4 is a block diagram showing the constitution of a low power consumption receiver section in a forth embodiment of the present invention.

The receiver section shown in FIG. 4 is a receiver section of the single superheterodyne system (single-IF system), and includes: a low noise amplifying stage 300 for giving a desired gain to a received high frequency signal, a bandpass filter (BPF) 500 for suppressing an undesired signal from an output signal of the low noise amplifying stage 300, a frequency converting stage 612 for converting a frequency of an output signal of the BPF 500 to a third intermediate frequency, a bandpass filter 615 for suppressing an undesired signal from an output signal of the frequency converting stage 612, a demodulator (DEM) 532 for frequency converting an output signal of the BPF 615 to a base band signal, a local oscillator 614 for supplying a local oscillating signal (local signal) to a frequency converting stage 612, and a signal processing section 323. In this respect, constituent elements of the receiver section similar to those in the above-mentioned embodiments are attached with similar reference numerals, and detailed explanations are omitted.

The demodulator 532 includes a variable gain amplifier, and its gain is controlled by a control signal S601 from the signal processing section 323 so that the output signal level of the demodulator 532 becomes constant.

The reduction of the power consumption explained in the first embodiment (FIG. 1) is, in the fourth embodiment, realized by the operation/non-operation control with respect to the low noise amplifying stage 300 and the frequency converting stage 612. The frequency converting stage 612 is similar to the constitution including the mixers 308, 309, 310, and the amplifiers 311, 312, 313, in the frequency converting stage 400 in the above-mentioned second embodiment. That is, the mixers 600, 601, 602 in the fourth embodiment operate similar operation to the mixer 308, and the amplifiers 603, 604, 605 operate similar operation to the amplifier 311.

The frequency converting stages 612 is divided into control units 609, 610, 611. The control unit 609 includes the mixer 600, and the amplifier 603. Also the control unit 610 includes the mixer 601, and the amplifier 604. Also, the control unit 611 includes the mixer 602, and the amplifier 605. And each of the control units is controlled as to the operation/non-operation by a control signal S600 from the signal processing section 323, and all the circuits included in the control unit are controlled to respective operation/non-operation states.

That is, in the receiver section in the fourth embodiment, the low noise amplifier 300, and the frequency converting stage 612 are controlled as to their operation/non-operation by the control signals S301, S600 from the signal processing section 323.

Figure 5:
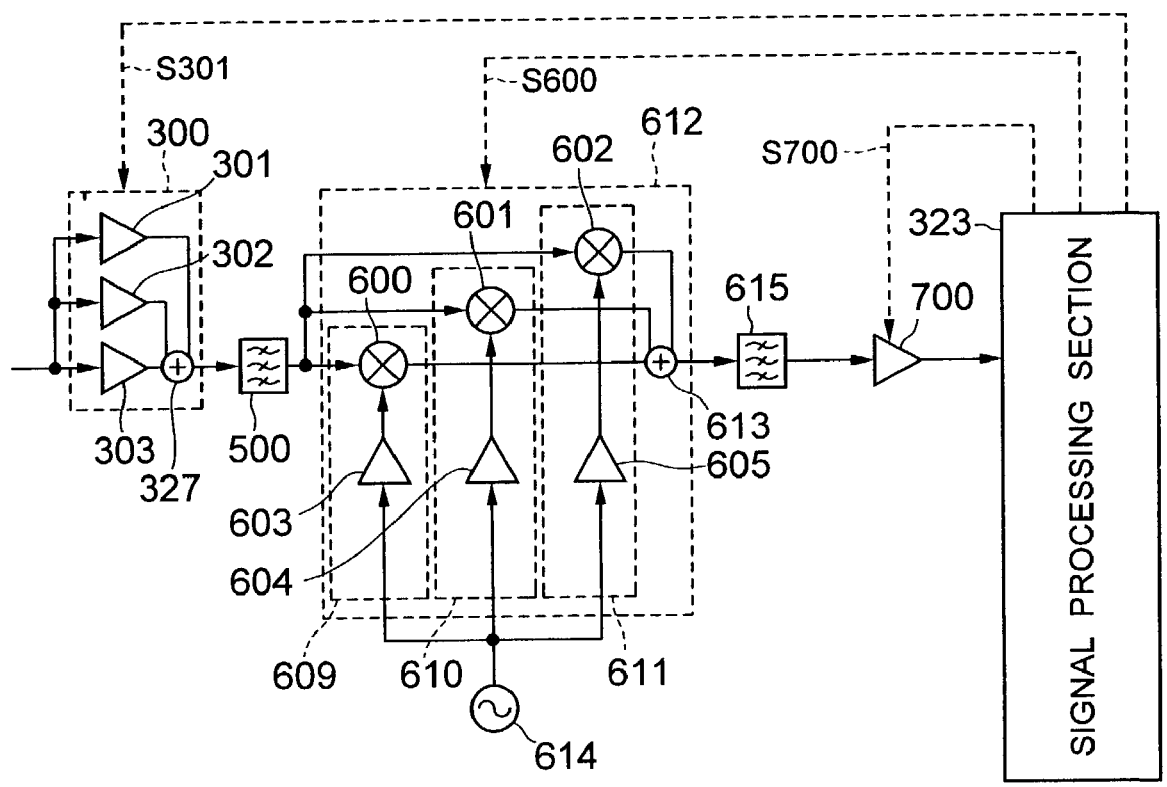
FIG. 5 is a block diagram of a receiver section of the digital-IF system in a fifth embodiment of the present invention.

FIG. 5 is a block diagram showing a constitution of a low power consumption receiver section in a fifth embodiment of the present invention.

The receiver section shown in FIG. 5 is a receiver section of the digital-IF system, and includes: a low noise amplifying stage 300 for giving a desired gain to a received high frequency signal, a banspass filter (BPF) 500 for suppressing an undesired signal from an output signal of the low noise amplifier 300, a frequency converting stage 612 for converting a frequency of an output signal of the bandpass filter 500 to a fourth intermediate frequency, a bandpass filter (BPF) 615 for suppressing an undesired signal from an output signal of the frequency converting stage 612, a variable gain amplifier 700 for giving a desired gain to an output signal of the BPF 615, a local oscillator 614 for supplying a local oscillating signal (local signal) to the frequency converting stage 612, and a signal processing section 323. In this respect, constituent elements of the receiver section similar to those in the receiver section (refer to FIGS. 1–4) in the above-mentioned embodiments are attached with similar reference numerals, and detailed explanations are omitted.

The gain of the variable gain amplifier 700 is controlled by a control signal S700 from the signal processing section 323 so that the output signal level becomes constant. The signal processing section 323, after converting an input signal to a digital signal, performs a predetermined digital signal processing, and demodulates to a desired audio, or a data signal.

The reduction of the power consumption explained in the first embodiment (FIG. 1) is, in the fifth embodiment, realized by the operation/non-operation control with respect to the low noise amplifying stage 300 and the frequency converting stage 612. The frequency converting stage 612 is similar to the constitution including the mixers 308, 309, 310, and the amplifiers 311, 312, 313, in the frequency converting stage 400 in the above-mentioned second embodiment (FIG. 2). That is, the mixers 600, 601, 602 in the fourth embodiment operate similar operation to the mixer 308, and the amplifiers 603, 604, 605 operate similar operation to the amplifier 311.

The frequency converting stages 612 is divided into control units 609, 610, 611. The control unit 609 includes the mixer 600, and the amplifier 603. Also the control unit 610 includes the mixer 601, and the amplifier 604. Also, the control unit 611 includes the mixer 602, and the amplifier 605. And each of the control units is controlled as to the operation/non-operation by a control signal S600 from the signal processing section 323, and all the circuits included in the control unit are controlled to respective operation/non-operation states.

That is, in the receiver section in the fifth embodiment, the low noise amplifier 300, and the frequency converting stage 612 are controlled as to their operation/non-operation by the control signals S301, S600 from the signal processing section 323.

Figure 6:
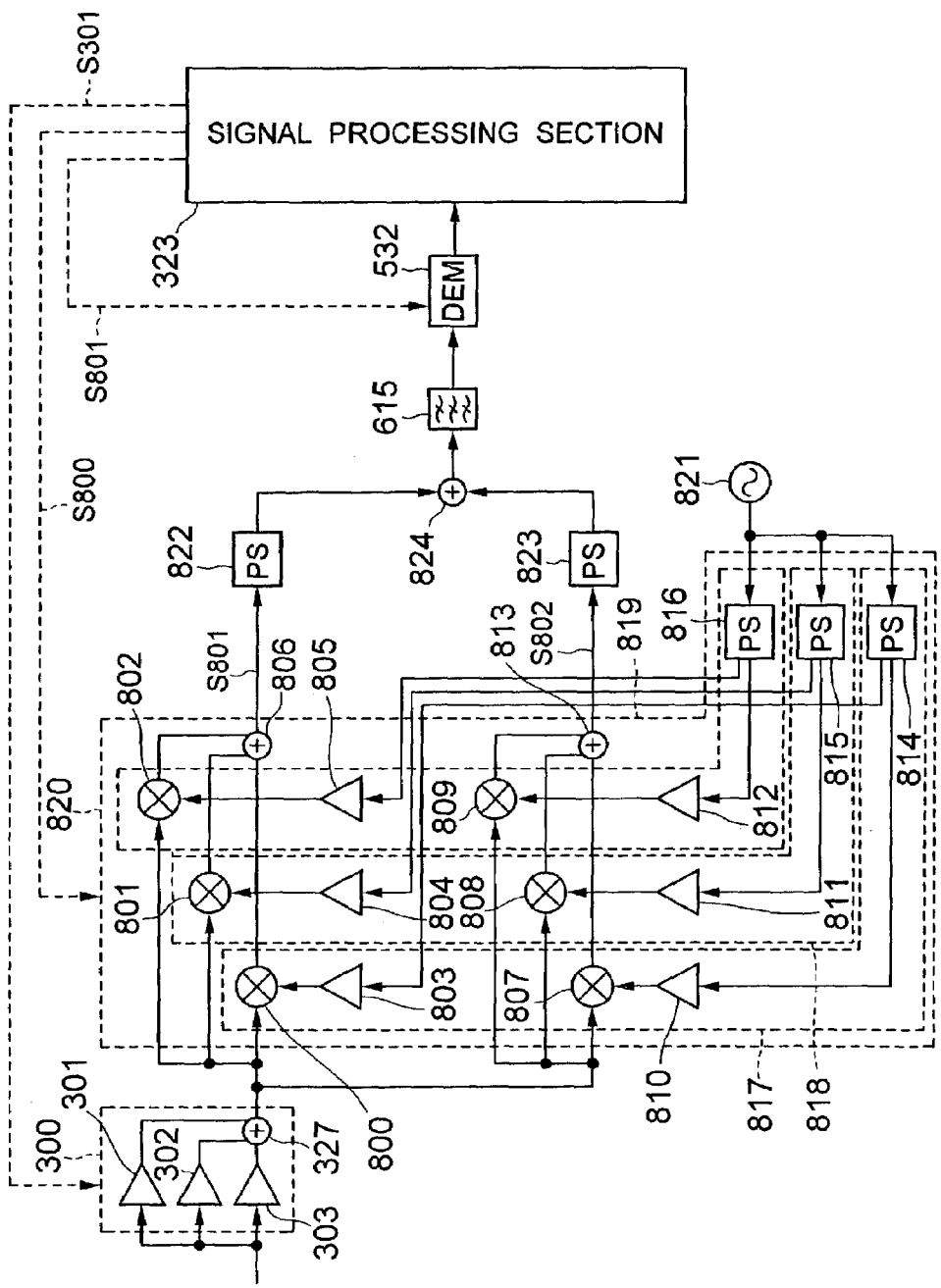
FIG. 6 is a block diagram of a receiver section of the image rejection system in a sixth embodiment of the present invention.

FIG. 6 is a block diagram showing a constitution of a low power consumption receiver section in a sixth embodiment of the present invention.

The receiver section shown in FIG. 6 is a receiver section of the image rejection system, and includes: a low noise amplifying stage 300 for giving a desired gain to a received high frequency signal, a frequency converting stage 820 for converting a frequency of an output signal of the low noise amplifying stage 300 to a fifth intermediate frequency, phase shifters 822 and 823 for converting phases of output signals S801 and S802 of the frequency converting stage 820, an adder 824 for adding output signals of the phase shifters 822 and 823, a bandpass filter 615 (BPF) 615 for passing only a signal of a desired frequency of an output signal of the adder 824, and for suppressing an undesired undesired signal, a demodulator (DEM) 532 for frequency converting an output signal of the BPF 615 to a base band signal, a local oscillator 821 for supplying a local signal to the frequency converting stage 820, and a signal processing section 323. In this respect, constituent elements of the receiver section similar to those in the receiver section (refer to FIGS. 1–5) in the above-mentioned embodiments are attached with similar reference numerals, and detailed explanations are omitted.

A phase shift difference provided by the phase shifters 822 and 823 is 90 degrees. That is, a difference between the amount of phase shift of the signal S801 passing through the phase shifter 822 and the amount of phase shift of the signal S802 passing through the phase shifter 823 is 90 degrees.

The demodulator 532 includes a variable gain amplifier, and its gain is controlled by the control signal S801 from the signal processing section 823.

The reduction of the power consumption explained in the first embodiment (FIG. 1) is, in the sixth embodiment, realized by the operation/non-operation control with respect to the low noise amplifying stage 300 and the frequency converting stage 820. The frequency converting stage 820 is similar to the constitution including the mixers 308, 309, 310, and the amplifiers 311, 312, 313, in the frequency converting stage 400 in the above-mentioned second embodiment (FIG. 2). That is, the mixers 800, 801, 802, 807, 808, 809 in the sixth embodiment operate similar operation to the mixer 308, and the amplifiers 803, 804, 805, 810, 811, 812 operate similar operation to the amplifier 311.

The frequency converting stage 820 is divided into control units 817, 818, 819. The control unit 817 includes the mixers 800, 807, the amplifiers 803, 810, and the phase shifter 814. Also the control unit 818 includes the mixers 801, 808, the amplifiers 804, 811, and the phase shifter 815. Also, the control unit 819 includes the mixers 802, 809, the amplifiers 805, 812, and phase shifter 816. And each of the control units is controlled as to the operation/non-operation by a control signal S800 from the signal processing section 323, and all the circuits included in the control units are controlled to respective operation/non-operation states.

That is, in the receiver section in the sixth embodiment, the low noise amplifier 300, and the frequency converting stage 820 are controlled respectively as to their operation/non-operation by the control signals S301, S800 from the signal processing section 323.

Figure 7:
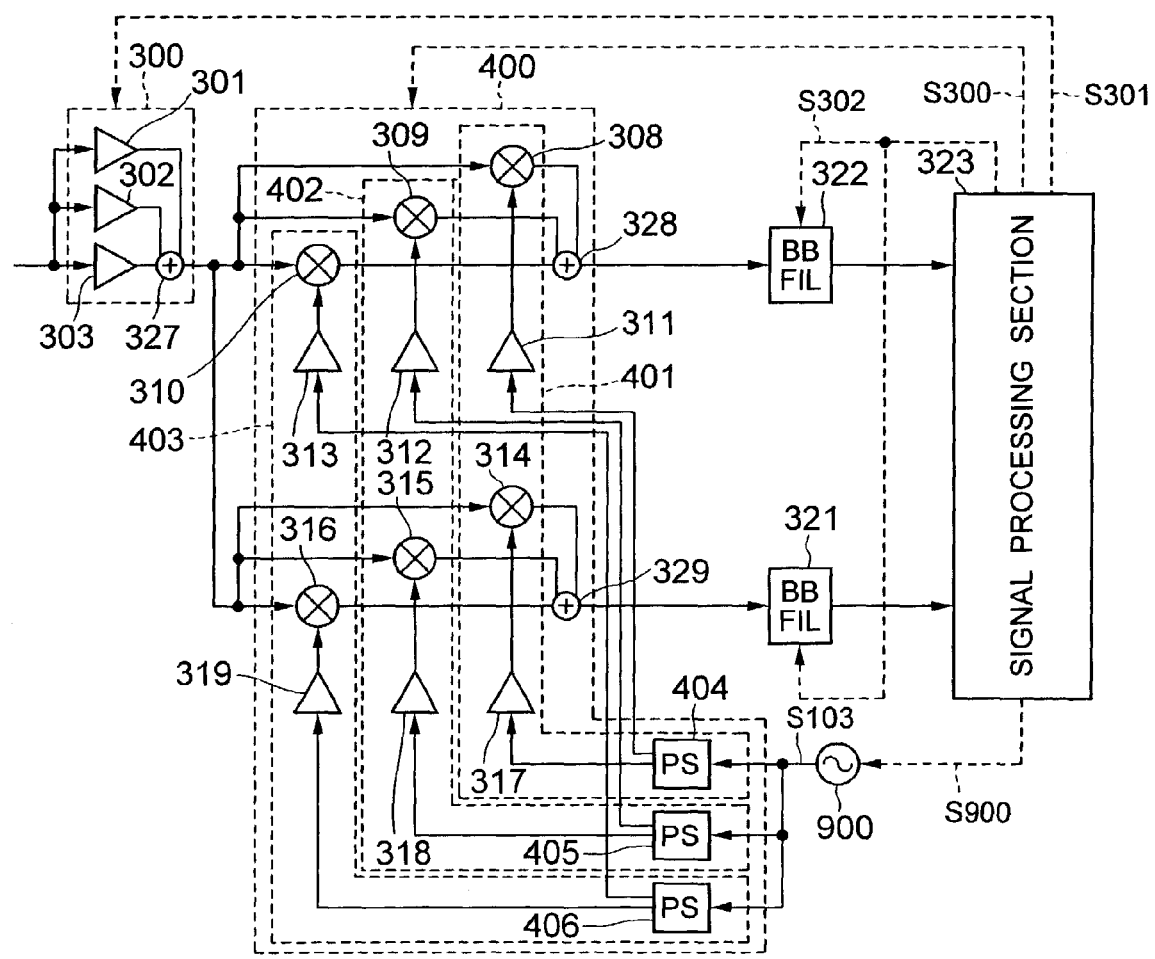
FIG. 7 is a block diagram of a receiver section of the direct conversion system using variable phase noise type local oscillator in a seventh embodiment of the present invention.

FIG. 7 is a block diagram showing a constitution of a low power consumption receiver section in a seventh embodiment of the present invention.

The receiver section shown in FIG. 7 has a feature in which the local oscillator 326 in the first embodiment (FIG. 1) is replaced by a local oscillator 900 of the variable phase noise type, and the phase noise of the local oscillator 900 is controlled by a control signal S900 from the signal processing section 323. Also, similar constituent elements of the receiver section to those in the receiver sections (refer to FIGS. 1–6) in the above-mentioned embodiments are attached with similar reference numerals and their detailed explanations are omitted.

As described in the foregoing, with reference to equation 2, when the received signal level is large, and CNin of a signal (received signal at an antenna) inputted to the low noise amplifier 300 is large, CN (carrier to noise ratio) of the output signal of the receiver section becomes excessively large. As a result, even when the phase noise (PN) of the local oscillation signal (local signal) S103 produced by the local oscillator 900 is deteriorated to the amount of that excessively large CN, it is possible to secure sufficient CN at the receiver section output.

Depending on the received signal level inputted to the low noise amplifying stage 300, it is controlled so that one or more circuits are operated among the low noise amplifiers (LNAs) of the low noise amplifying stage 300, and the control units of the frequency converting stage 400. And depending on the received signal level inputted to the low noise amplifying stage 300, the phase noise of the local signal produced by the local oscillator 900 is controlled. In other words, when the received signal level is large, it is controlled so that the phase noise in the local signal produced by the local oscillator 900 is increased, and when the received signal level is small, the phase noise in the local signal produced by the local oscillator 900 is decreased.

And the controlled number of operating LNAs of the low noise amplifying stage 300, and the number of control units of the frequency converting stage 400, and the level of the phase noise in the local signal produced by the local oscillator 900 are determined by CN required in the receiver output decided by the system and the signal processing section 323, and the current consumption of the LNAs and the control units.

Figure 8:
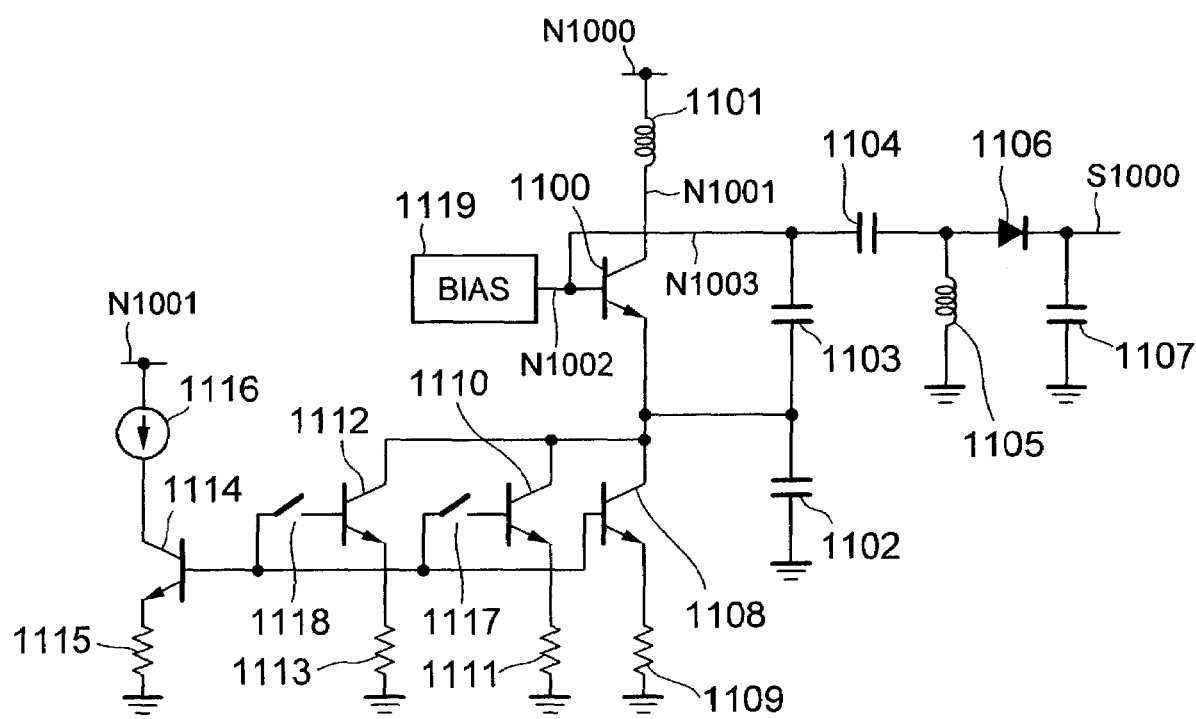
FIG. 8 is a circuit diagram of the variable phase noise type local oscillator in the seventh embodiment of the present invention.

FIG. 8 is a circuit diagram of the local oscillator 900 of the variable phase noise type used in the seventh embodiment (FIG. 7), and an oscillator shown in FIG. 8 is a voltage-controlled oscillator of the Colpitts type.

In FIG. 8, terminals N1000, N1001 are connected to a power supply. An inductor 1105, a varactor diode 1106, and capacitor 1107 constitute a resonator, and a resonance frequency is controlled by a control voltage S1000. Also, a bias voltage source 1119 supplies a bias voltage to a transistor 1100. Transistors 1108, 1110, 1112, 1114, and resistors 1109, 1111, 1113, 1115 constitute a current mirror circuit. A bias current of the transistor 1100 is supplied from a constant current source 1116 through the current mirror circuit. The output signal of the voltage-controlled oscillator is taken out from the terminal N1001, or N1002, or N1003.

This voltage-controlled oscillator is controlled with respect to on and off operation of switches 1117, 1118 by a control signal S900 (refer to FIG. 7) from the signal processing section 323, and by this, the bias current of the transistor 1100 is controlled. The phase noise of this voltage-controlled oscillator is varied depending on the output level of the oscillator. In other words, since the magnitude of the phase noise is determined by the bias current of the transistor 1100, the magnitude of the phase noise can be controlled by the on-off control of the switches 1117, 1118. That is, when the switches enter on-state, the bias current of the transistor 1100 increases, and as the output level of the oscillator increases, the magnitude of the phase noise is also increased. On the other hand, when the switches 1117, 1118 enter off state, the bias current of the transistor 1100 decreases, and as the output level of the oscillator decreases, the magnitude of the phase noise is also reduced.

Figure 9:
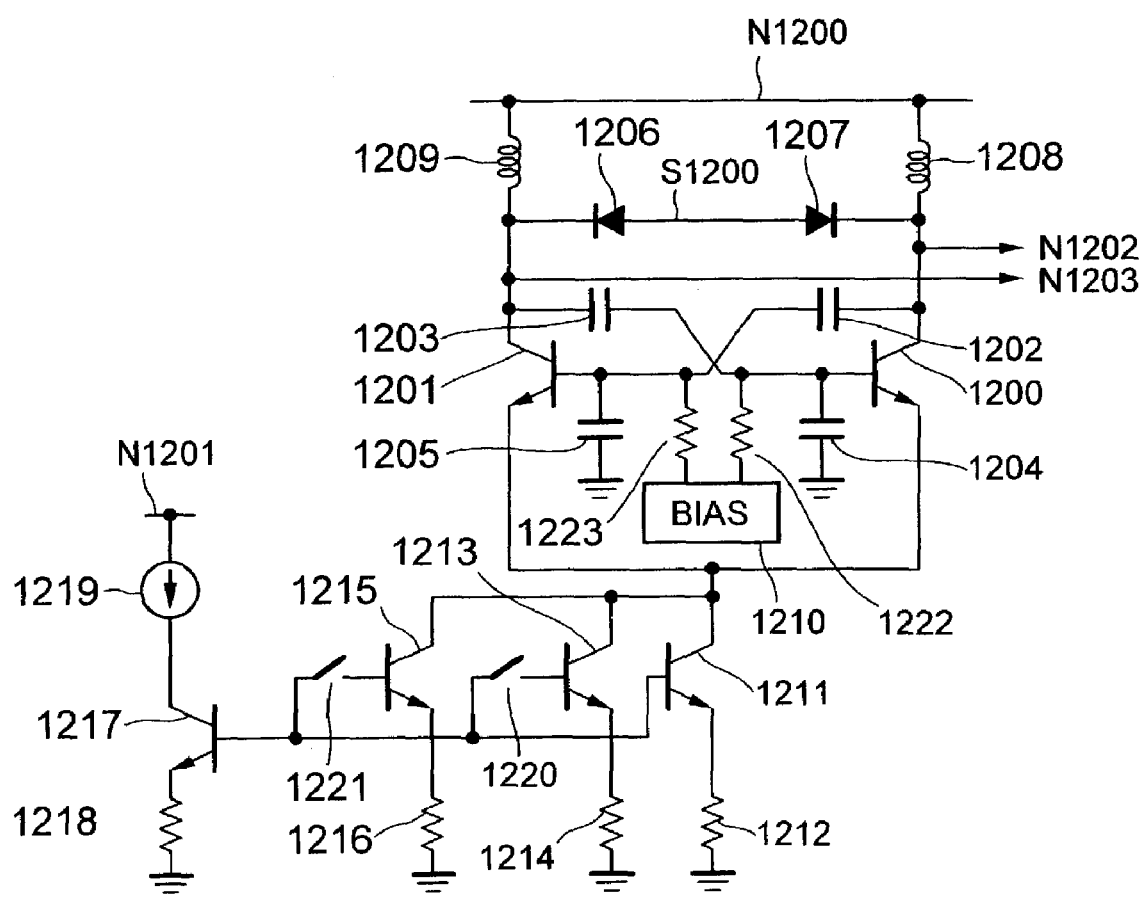
FIG. 9 is another circuit diagram of the variable phase noise type local oscillator in the seventh embodiment of the present invention.

FIG. 9 is a circuit diagram of another constitution of the local oscillator of the variable phase noise type used in the seventh embodiment (FIG. 7), and the oscillator shown in FIG. 9 is a voltage-controlled oscillator of the differential type.

In FIG. 9, terminals N1200, N1201 are connected to a power supply. An inductors 1208, 1209, and varactor diodes 1206, 1207 constitute a resonator, and a resonance frequency is controlled by a control voltage S1200. Also, a bias voltage source 1210 supplies a bias voltage to transistors 1200, 1201. Transistors 1211, 1213, 1215, 1217, and resistors 1212, 1214, 1216, 1218 constitute a current mirror circuit. A bias current of the transistors 1200, 1201 is supplied from a constant current source 1219 through the current mirror circuit. The output signal of this voltage-controlled oscillator is taken out from the terminals N1202, 1203 as a differential signal.

This voltage-controlled oscillator is controlled with respect to on—off operation of switches 1220, 1221 by a control signal S900 (refer to FIG. 7) from the signal processing section 323, and by this, the bias current of the transistors 1200, 1201 is controlled. The phase noise of this voltage-controlled oscillator is varied depending on the output level of the oscillator. In other words, since the magnitude of the phase noise is determined by the bias current of the transistors 1200, 1201, the magnitude of the phase noise can be controlled by the on-off control of the switches 1220, 1221. That is, when the switches 1220, 1221 enter on-state, the bias current of the transistors 1200, 1201 increases, and as the output level of the oscillator increases, the magnitude of the phase noise is also increased. On the other hand, when the switches 1220, 1221 enter off state, the bias current of the transistors 1200, 1201 decreases, and as the output level of the oscillator decreases, the magnitude of the phase noise is also reduced.

Figure 10:
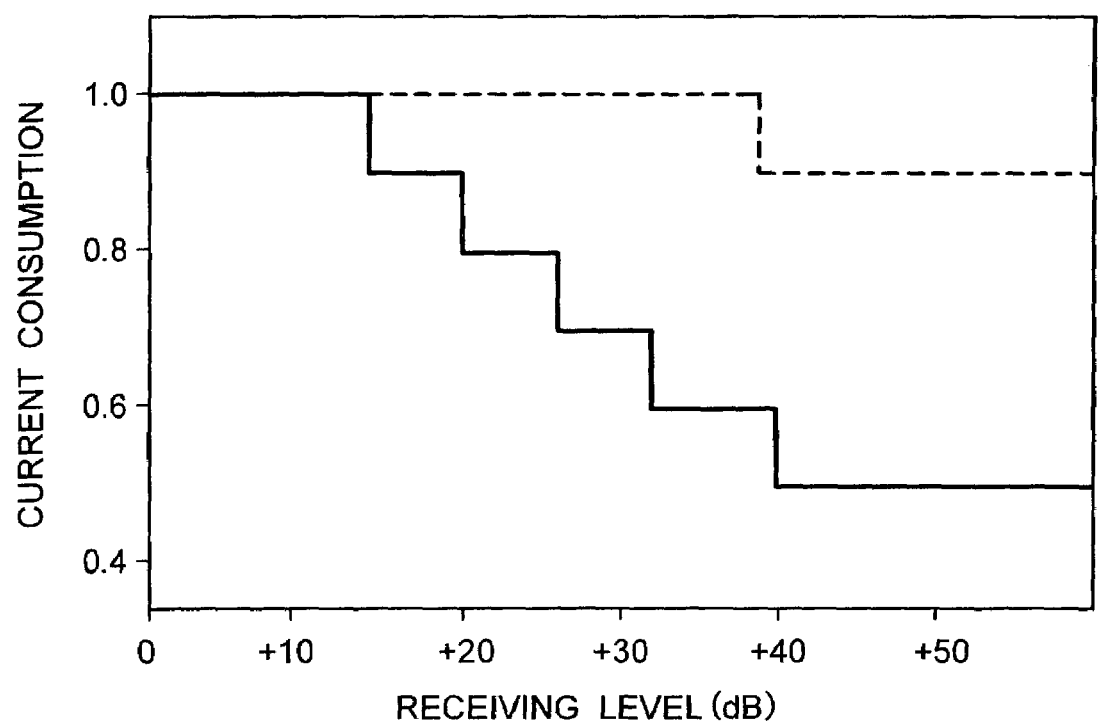
FIG. 10 is a diagram for explaining the power consumption of the receiver section in the embodiments of the present invention.
Figure 11:
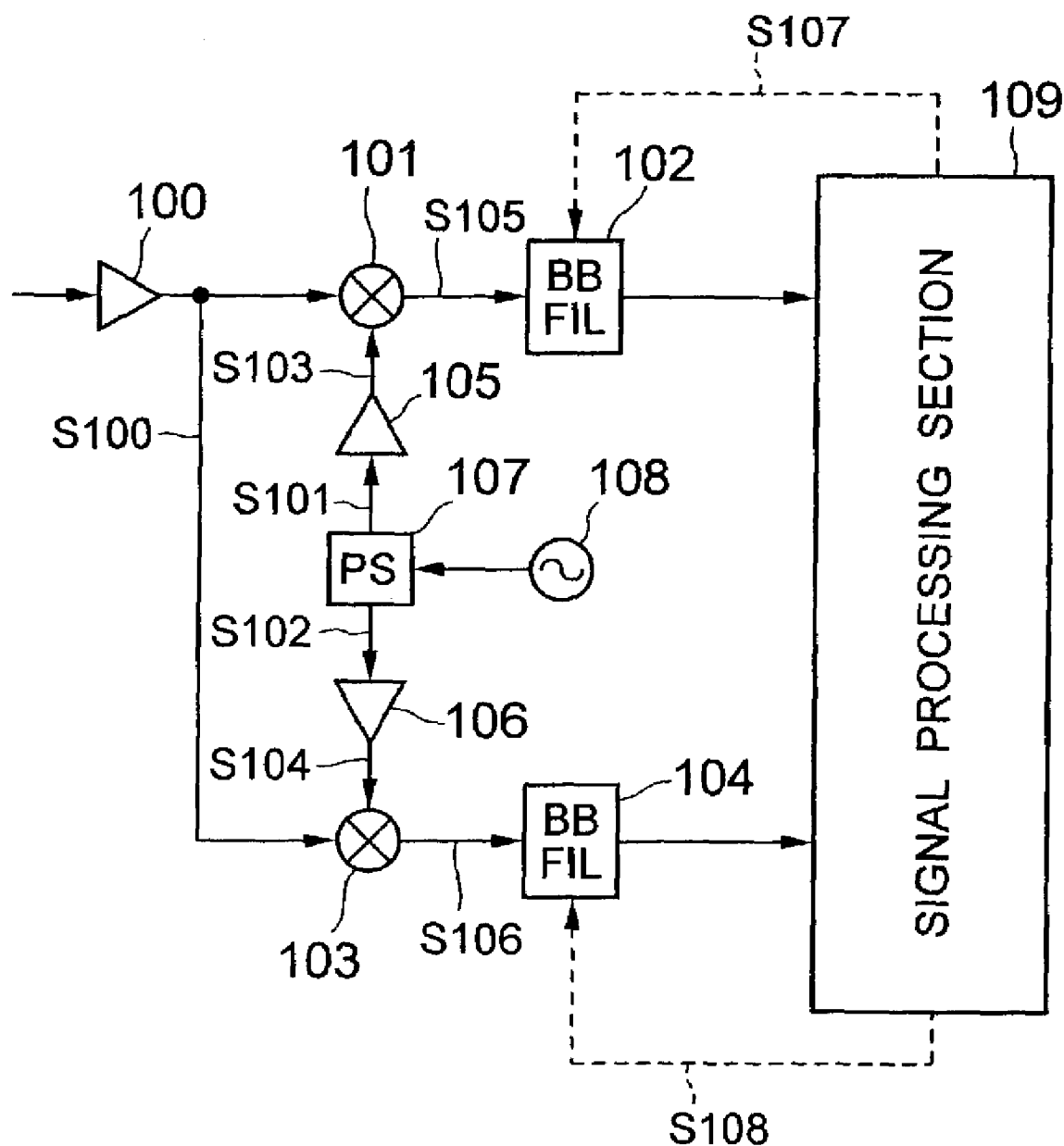
FIG. 11 is a block diagram of an example of a receiver section.
Figure 12:
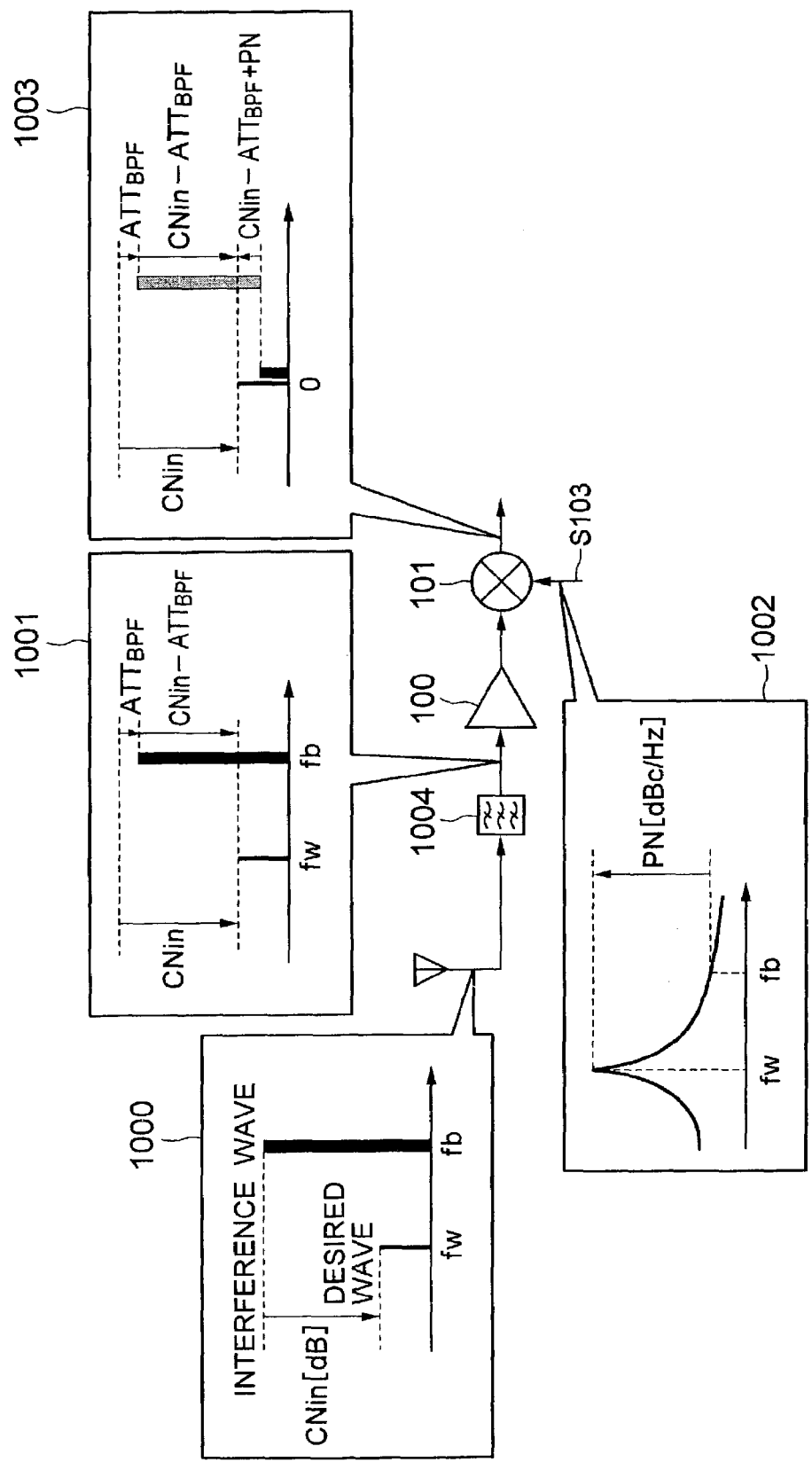
FIG. 12 is a diagram for explaining the influence of the phase noise in a local oscillating signal in the example of receiver section.
Figure 13:
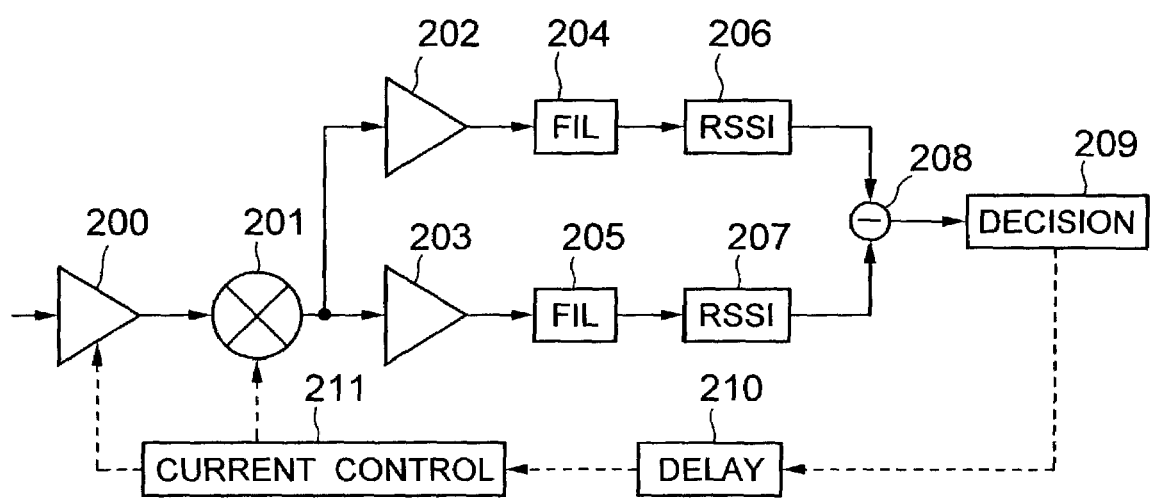
FIG. 13 is a block diagram of another example of a receiver section.

FIG. 10 is a diagram for explaining a change in the power consumption of the receiver section in the embodiments of the present invention. In this receiver section, the low noise amplifying stage 300 includes two low noise pre-amplifiers (LNAs), and the frequency converting stage includes six mixers connected in parallel, and the change in the power consumption of the receiver section caused by a change in the received signal level is shown.

In FIG. 10, the solid line indicates the manner in which by changing over the operation of the frequency converting stage, the number of operating mixers is changed so that the current consumption is varied. Also the broken line indicates the manner in which by changing over the operation of the low noise amplifying stage, the number of operating low noise amplifiers (LNAS) is changed so that the current consumption is varied.

In this manner, by changing not only the number of operating LNAs, but also the number of operating mixers, the power consumption can be reduced. Also, by increasing the number of mixers connected in parallel, the current consumption can be reduced.

As typical view points of the present invention other than those recited in claims, the following matters can be listed.

(1) A receiver apparatus provided with a receiver section including: an amplifying stage for amplifying a high frequency signal received by an antenna, a frequency converting stage for converting a frequency of an output signal of the amplifying stage, and a local oscillator for supplying a local oscillating signal to the frequency converting stage, wherein
the frequency converting stage includes;
a plurality of frequency converters provided in parallel, and an adder for adding output signals of the frequency converters, and
the number of the frequency converters to be operated is controlled depending on a signal intensity inputted to the receiver section.

(2) A receiver apparatus provided with a receiver section including: an amplifying stage for amplifying a high frequency signal received by an antenna, a frequency converting stage for converting a frequency of an output signal of the amplifying stage, and a
local oscillator for supplying a local oscillating signal to the frequency converting stage, wherein the local oscillator controls a phase noise level of a local oscillating signal outputted, depending on a signal intensity inputted to the receiver section.

(3) A receiver apparatus provided with a receiver section including: an amplifying stage for amplifying a high frequency signal received by an antenna, a frequency converting stage for converting a frequency of an output signal of the amplifying stage, and a local oscillator for supplying a local oscillating signal to the frequency converting stage, and provided with a signal processing section for supplying a control signal to the local oscillator depending on signal intensity inputted to the signal processing section from the receiver section, wherein
the local oscillator controls a phase noise level of the local oscillating signal in accordance with the control signal.

In the inventions described in items (2) and (3), since the signal processing section controls the phase noise level of the local oscillating signal depending on the signal intensity inputted to the receiver section, or the signal intensity inputted to the signal processing section from the receiver section, when a received signal level is large, and the carrier-to-noise ratio (CN) value at the receiver section output is excessively better than a desired level, it is possible to reduce the power consumption of the receiver section by controlling the phase noise level of the local oscillator while maintaining the dynamic range of the frequency converting stage. As a result, the power consumption of the receiver section can be reduced without causing the deterioration of the demodulation quality due to an interference wave.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A receiver apparatus comprising:
   a receiver section including an amplifying stage for amplifying a high frequency signal received by an antenna, a frequency converting stage for converting a frequency of an output signal of said amplifying stage, and a local oscillator for supplying a local oscillating signal to said frequency converting stage; and
   a signal processing section for supplying a control signal to said receiver section depending on signal intensity inputted to said receiver section, or signal intensity inputted to said signal processing section from said receiver section, wherein said frequency converting stage includes
   a plurality of frequency converters provided in parallel, and an adder for adding output signals of said frequency converters, and
   said signal processing section controls by said control signal, the number of frequency converters to be operated.

2. A receiver apparatus according to claim 1, wherein said frequency converters includes a mixer for converting a frequency by combining signals, and a buffer amplifier for amplifying said local oscillating signal and supplying to said mixer.

3. A receiver apparatus according to claim 2, wherein said buffer amplifier is arranged in a pair with said mixer, and the output of said buffer amplifier is supplied to one of said mixers.

4. A receiver apparatus according to claim 3, wherein said amplifying stage includes a plurality of pre-amplifiers provided in parallel, and an adder for adding outputs of said pre-amplifiers,
said signal processing section, by said control signal, controls the number of said plurality of pre-amplifiers to be operated.

5. A receiver apparatus according to claim 2, wherein said signal processing section supplies a control signal to said local oscillator depending on signal intensity inputted to the signal processing section from said receiver section, and
said local oscillator controls a phase noise level of said local oscillating signal by said control signal.

6. A receiver apparatus according to claim 5, wherein said local oscillator includes an oscillating circuit having a resonator, and a bias current section for deciding a bias current of said oscillating circuit, said bias current section includes a constant current source, and a plurality of switching elements forming a plurality of current mirror circuits together with said constant current source, and said local oscillator, by said control signal, opens or closes said plurality of switching elements, and controls the number of said plurality of current mirror circuits to be operated.

7. A receiver apparatus according to claim 5, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

8. A receiver apparatus according to claim 2, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

9. A receiver apparatus according to claim 1, wherein said frequency converters includes a mixer for converting a frequency by combining signals, a phase shifter for converting a phase of said local oscillating signal, and a buffer amplifier for amplifying an output signal of said phase shifter and supplying to said mixer.

10. A receiver apparatus according to claim 9, wherein said buffer amplifier is arranged in a pair with said mixer, and the output of said buffer amplifier is supplied to one of said mixers.

11. A receiver apparatus according to claim 10, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

12. A receiver apparatus according to claim 9, wherein said signal processing section supplies a control signal to said local oscillator depending on signal intensity inputted to the signal processing section from said receiver section, and said local oscillator controls a phase noise level of said local oscillating signal by said control signal.

13. A receiver apparatus according to claim 12, wherein said local oscillator includes an oscillating circuit having a resonator, and a bias current section for deciding a bias current of said oscillating circuit, said bias current section includes a constant current source, and a plurality of switching elements forming a plurality of current mirror circuits together with said constant current source, and said local oscillator, by said control signal, opens or closes said plurality of switching elements, and controls the number of said plurality of current mirror circuits to be operated.

14. A receiver apparatus according to claim 12, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

15. A receiver apparatus according to claim 9, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

16. A receiver apparatus according to claim 1, wherein said signal processing section supplies a control signal to said local oscillator depending on signal intensity inputted to the signal processing section from said receiver section, and said local oscillator controls a phase noise level of said local oscillating signal by said control signal.

17. A receiver apparatus according to claim 16, wherein said local oscillator includes an oscillating circuit having a resonator, and a bias current section for deciding a bias current of said oscillating circuit, said bias current section includes a constant current source, and a plurality of switching elements fonning a plurality of current mirror circuits together with said constant current source, and said local oscillator, by said control signal, opens or closes said plurality of switching elements, and controls the number of said plurality of current mirror circuits to be operated.

18. A receiver apparatus according to claim 17, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

19. A receiver apparatus according to claim 16, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

20. A receiver apparatus according to claim 1, wherein said amplifying stage includes a plurality of pre-amplifiers provided in parallel, and an adder for adding outputs of said pre-amplifiers, said signal processing section, by said control signal, controls the number of said plurality of pre-amplifiers to be operated.

* * * * *